(12) United States Patent
Morrison et al.

(10) Patent No.: US 7,418,365 B2
(45) Date of Patent: *Aug. 26, 2008

(54) METHOD FOR VERIFYING AND/OR DETECTING TAMPERING

(75) Inventors: Donald A. Morrison, Bellbrook, OH (US); Rudolph J. Klein, Centerville, OH (US)

(73) Assignee: Paxar Americas, Inc., Miamisburg, OH (US)

( * ) Notice: Subject to any disclaimer, the term of this patent is extended or adjusted under 35 U.S.C. 154(b) by 255 days.

This patent is subject to a terminal disclaimer.

(21) Appl. No.: 11/446,774

(22) Filed: Jun. 5, 2006

(65) Prior Publication Data
US 2006/0224355 A1 Oct. 5, 2006

Related U.S. Application Data

(63) Continuation-in-part of application No. 10/935,385, filed on Sep. 7, 2004, now Pat. No. 7,096,151.

(51) Int. Cl.
*G06F 15/00* (2006.01)
(52) U.S. Cl. .......................... 702/173; 705/1
(58) Field of Classification Search ................ 702/173; 705/1

See application file for complete search history.

(56) References Cited

U.S. PATENT DOCUMENTS

| 5,908,283 A | 6/1999 | Huang et al. |
|---|---|---|
| 2004/0193438 A1* | 9/2004 | Stashluk et al. ............... 705/1 |
| 2005/0004702 A1 | 1/2005 | McDonald |

* cited by examiner

*Primary Examiner*—Tung S. Lau
*Assistant Examiner*—Sujoy K Kundu
(74) *Attorney, Agent, or Firm*—Joseph J. Grass

(57) ABSTRACT

There is disclosed method of shipment verification and/or tamper detection, wherein a purchaser generates an ordering document such as a purchase order RFID-encoded with data identifying items on the order. The supplier gathers the items into a package or packages for the shipment and RFID encodes the shipment with both data relating to the items ordered and to the shipping package weight. When the shipment arrives at the customer's location, the customer decodes the RFID package transponder and compares the items ordered with the items received and/or compares the decoded shipping package weight with the actual weight of the shipment and if there is an unallowable discrepancy in either or both, the customer is on notice that the shipment may be erroneous.

5 Claims, 5 Drawing Sheets

FIG. 4

METHOD FOR VERIFYING AND/OR DETECTING TAMPERING

CROSS-REFERENCE TO RELATED APPLICATION

This is a continuation-in-part of U.S. application Ser. No. 10/935,385, filed. Sep. 7, 2004 now U.S. Pat. No. 7,096,151.

BACKGROUND OF THE INVENTION

1. Field of the Invention

This invention relates to a method for verifying and/or detecting tampering.

2. Brief Description of the Prior Art

A prior art method for a customer to determine whether goods received correspond to goods that were shipped involve, in one example, manually inspecting the printed information on the outside of each individual package and comparing that to the purchase order or invoice information to confirm that the goods received correspond to the goods that were ordered and/or invoiced. In the event the goods are loaded onto a pallet and shrink wrapped, the customer would unpack the pallet and perform the above-mentioned comparison. It is also known to provide a load of palletized packages wherein the pallet and the package or packages are shrink wrapped into a unit and to have a shipping label applied to the shrink wrap. Such a shipping label has been provided with an RFID transponder encoded with shipping data. Typical shipping data comprises the shipper's return address, the carrier's information, the ship-to location, the postal code, the purchase order number, the product name, and the serial shipping container or product package number.

SUMMARY OF THE INVENTION

The invention relates to an improved method of indicating whether or not a product or a package was tampered with during shipment.

One specific embodiment of the invention includes weighing a packaged product, providing a pressure sensitive label having an RFID transponder, printing shipping data on the label and encoding the RFID transponder with the shipping package weight, applying the label to the product or its packaging, shipping the packaged product to the customer, weighing the packaged product after delivery to the customer, decoding the shipping package weight in the RFID transponder, and comparing the shipping package weight decoded from the RFID transponder with the received package weight to indicate tampering when the difference between the shipping package weight and the received package weight is outside allowable limits.

In another embodiment, when it is decided to order one or more products, an ordering document such as a purchase order is generated by the customer. The ordering document lists or accumulates the one or more products being ordered. Data representative of the product(s) being ordered is encoded in an RFID transponder applied to or already on the ordering document. A copy of the ordering document is sent to the supplier or the ordering data is transmitted to the supplier electronically. The order can be a single package, a pallet with one or more packages, multiple pallets, or pallets and one or more packages. The supplier gathers the ordered product or products to fill the order. If more than one product is ordered, the products may be grouped and packaged into at least one package and the packaged product or products are preferably weighed. An RFID transponder for the package is encoded with the shipping data and the shipping package weight. The package is forwarded, as by a common carrier, to the customer. The customer can weigh the package upon receipt from the supplier, decode the package transponder data, which includes the shipping data and the shipping package weight, compare the shipping package weight decoded from the package transponder and the actual package weight, and if the weight difference is outside allowable limits, the package is noticed as being suspect for example having been tampered with. Also, the customer can compare the ordering data to the shipping data, and if there is a lack of coincidence between the product(s) ordered and the product(s) received, the shipment is deemed to be flawed. When a shipment cannot be verified, that is fails the weight comparison test and/or the product coincidence test, the package and its contents can be further inspected as by diverting the shipment to another area for off-line inspection to assess the anomaly. While it is preferred to perform both the ordering document data comparison with the received product data and shipping package weight data comparison with the received package weight data, one can be performed without performing the other.

BRIEF DESCRIPTION OF THE DIAGRAMMATIC DRAWINGS

FIG. 4 is a top plan view of an ordering document; and

DETAILED DESCRIPTION OF THE PREFERRED EMBODIMENTS

Figure 1:
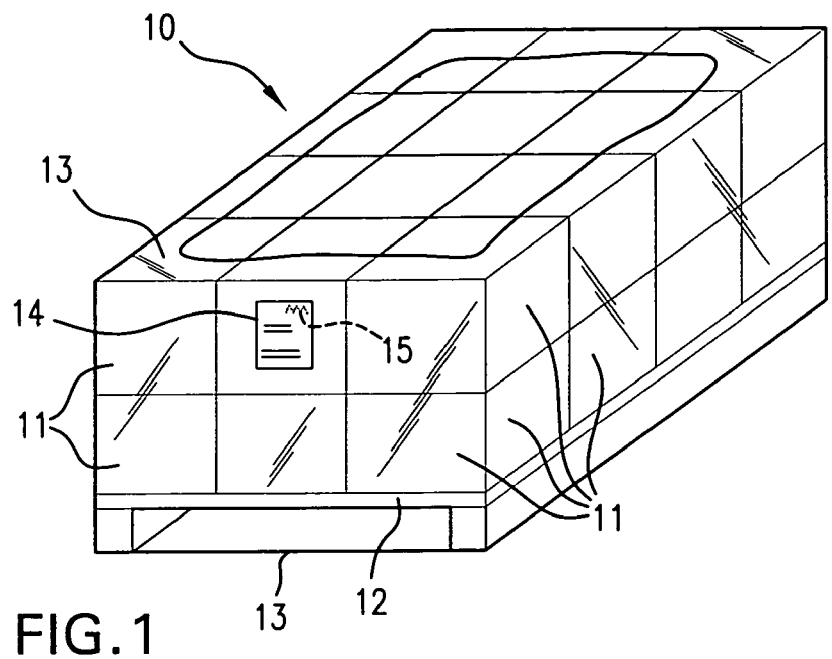
FIG. 1 is a perspective view of packages on a pallet with an applied shipping-data-bearing label having an RFID transponder encoded with shipping weight data.
Figure 2:
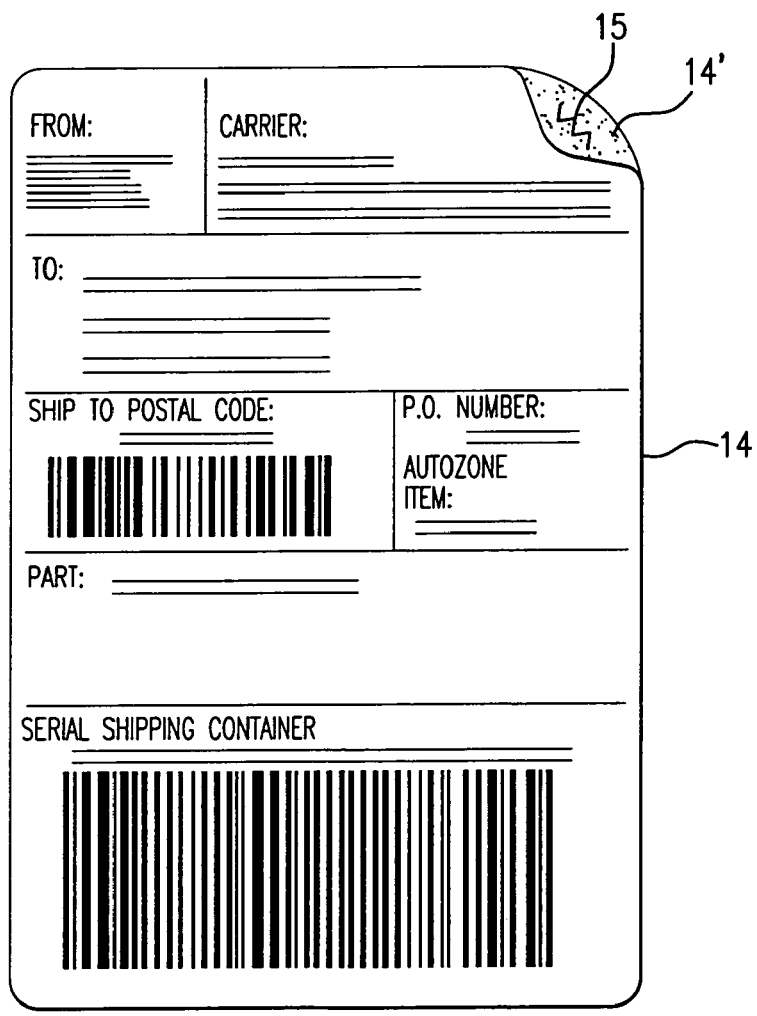
FIG. 2 is a plan view of the label shown in FIG. 1.

With reference to FIG. 1, there is shown a product package or load generally indicated at 10 having a plurality of individual packages or containers 11 of products loaded onto a pallet 12. The packages 11 and the pallet 12 are essentially completely covered with shrink wrap, a transparent plastics film material, indicated at 13 to hold the individual packages 11 against shifting on the pallet 12. A pressure sensitive label 14 having a pressure sensitive adhesive 14' (FIG. 2) on its underside is adhesively adhered to the outside of the shrink wrap 13. The adhesive 14' is preferably a permanent type adhesive which adheres tenaciously to the shrink wrap 13. An RFID transponder 15 on label 14, preferably on the underside of the label 14 between the label 14 and the shrink wrap 13. The label 14 may be referred to as a shipping label or a load label. The label 14 may also be located on one of the packages 11 under the shrink wrap 13. The load label 14 is shown in FIG. 2 and has various fields requiring certain shipping information or data as illustrated.

Figure 3:
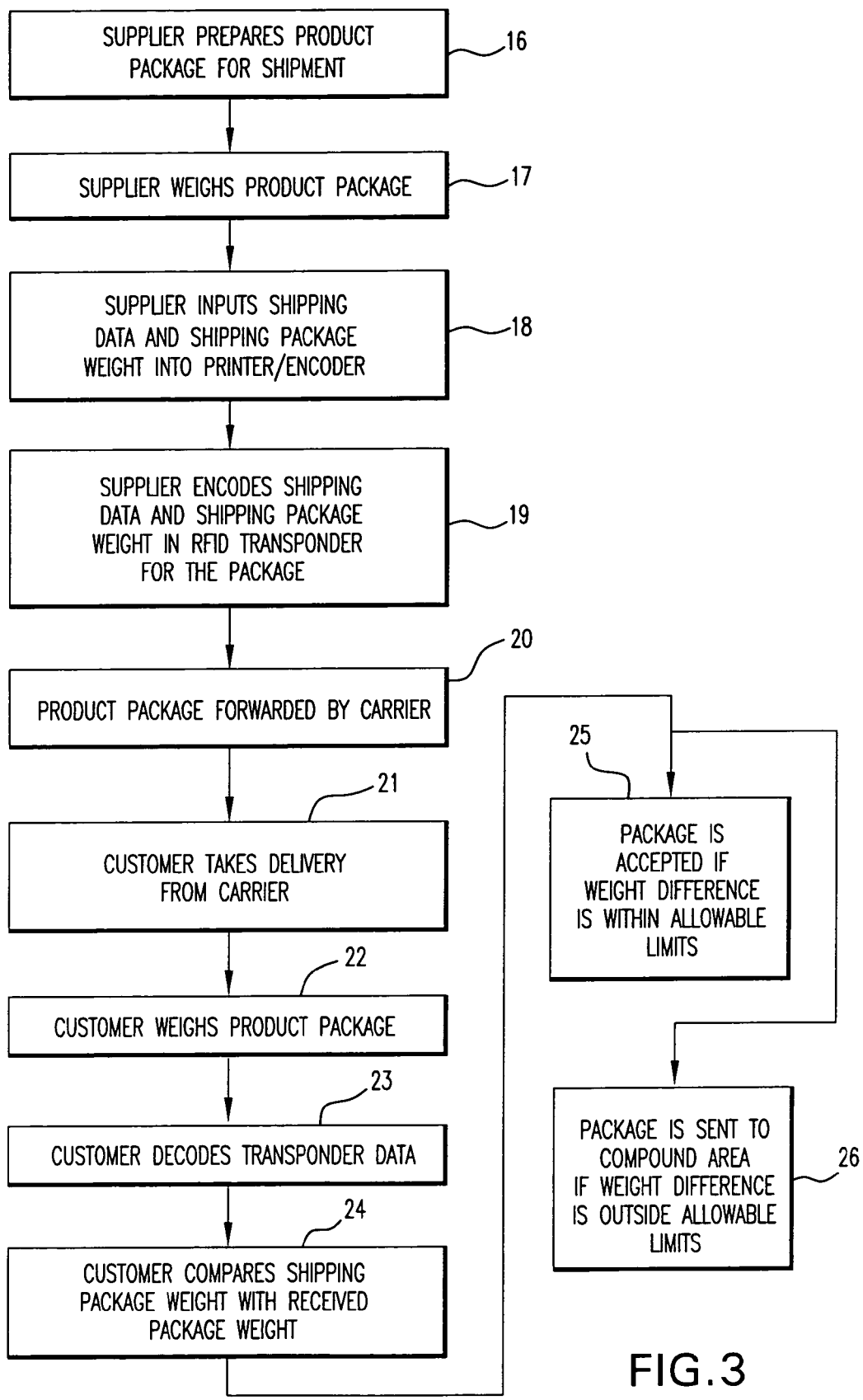
FIG. 3 is a flow chart illustrating one embodiment of the method of the invention.

In one specific embodiment illustrated in FIG. 3, the supplier prepares the product package 10 for shipment as indicated at 16. The package or load 10 can comprise a single product or container, or it can comprise multiple products or containers as shown at 11 in FIG. 1. The packaged product 10 is weighed as shown at 17 and the weight data or shipping package weight is then inputted into an RFID printer/encoder as indicated at 18. The shipping data can also be inputted or encoded directly into the transponder. Next the supplier prints some or all of the shipping data in the selected fields on the shipping label and electromagnetically encodes or writes the shipping package weight and, if desired, the shipping data into the transponder 15 as indicated at 19. This can be performed in an RFID printer sold by Paxar Americas, Inc. depicted in U.S. patent application Ser. No. 10/873,979 filed Jun. 22, 2004, publication No. U.S. 2006/0052981 published Mar. 9, 2006. If desired, the weight data can be inputted from a scale directly to a printer/encoder where the weight data can be written into the transponder, either with or without the shipping data. Next the load 10 is typically taken by the common carrier for transport to the customer as indicated at 20. However, the load 10 may pass through numerous hands before reaching the customer, thereby affording thieves numerous opportunities to remove some of the contents of the load. For example, the common carrier may collect the load 10 from the supplier and truck it to the trucker's consolidation terminal, and from there it may be trucked to a customer's distribution warehouse, and from there the product package may be trucked to the customer's place of business. After the customer takes delivery of the product package 10 as indicated at 21, the customer weighs the product package 10 as indicated at 22. For security reasons, the weight data may be encoded solely in the transponder 15, the thus the weight data is not visible or readily accessible to a would-be thief. The customer can decode the transponder 15 to retrieve the weight data therein as indicated at 23. In that the customer now has both the weight data of the received product package 10 and the weight data stored in the transponder 15, the customer can compare the two pieces of data as indicated at 24 and decide whether or not the difference between the two pieces of data is within allowable limits as indicated at 25 or is outside allowable limits as indicated at 26.

One of the advantages of this RFID-based security system is that the process is automatable in a computer-connected arrangement, virtually eliminating lost time and a source of human error.

The weight data can be derived from a scale that can input the weight data into a computer according to block 22, and the weight data from the transponder 15 can be inputted into the same computer according to block 23. The computer can be programmed to compare the two pieces of weight data. The allowable difference can be predetermined both as to actual differences and/or as to a percentage difference. For example, a decision can be made that a weight difference equaling up to plus or minus one kilogram can be within allowable limits, but any greater difference may indicate tampering. Alternatively, if the difference is no more than plus or minus one-quarter percent, then the difference is within allowable limits, but any greater percentage difference may indicate tampering. Also, the computer can be programmed to indicate tampering if the difference is greater either than a certain weight, e.g., one kilogram, or a certain percentage, e.g., one-quarter percent. If the received product package is within allowable limits, the product package 10 can be opened or routed to other handling stations or locations. If the received product package 10 is outside allowable-limits, the product package 10 can be sent to a compound or quarantine area where tampering can be documented for insurance and/or law enforcement purposes before the product package 10 is opened.

While the steps in blocks 16 through 26 are illustrative, they are not to be considered limiting because this disclosure is more extensive than the flow chart of FIG. 3. For example, the shipping data need not be inputted into the transponder 15 if desired, and the weight data can be inputted to the computer or the computer printer directly from the scale used to weigh the product package 10 according to block 17. Also, the customer can decode the transponder 15 before or simultaneously with weighing of the delivered product package 10. Once the weight of the delivered product package 10 is ascertained and the RFID transponder 15 is decoded, the customer can compare the two weights and determine for himself/herself without the use of any aid such as a computer whether or not the product package 10 may have been tampered with.

While it is preferred that the RFID transponder be part of a pressure sensitive label, the RFID transponder can be suitably incorporated into the package carton or it can be on the product per se.

Figure 4:
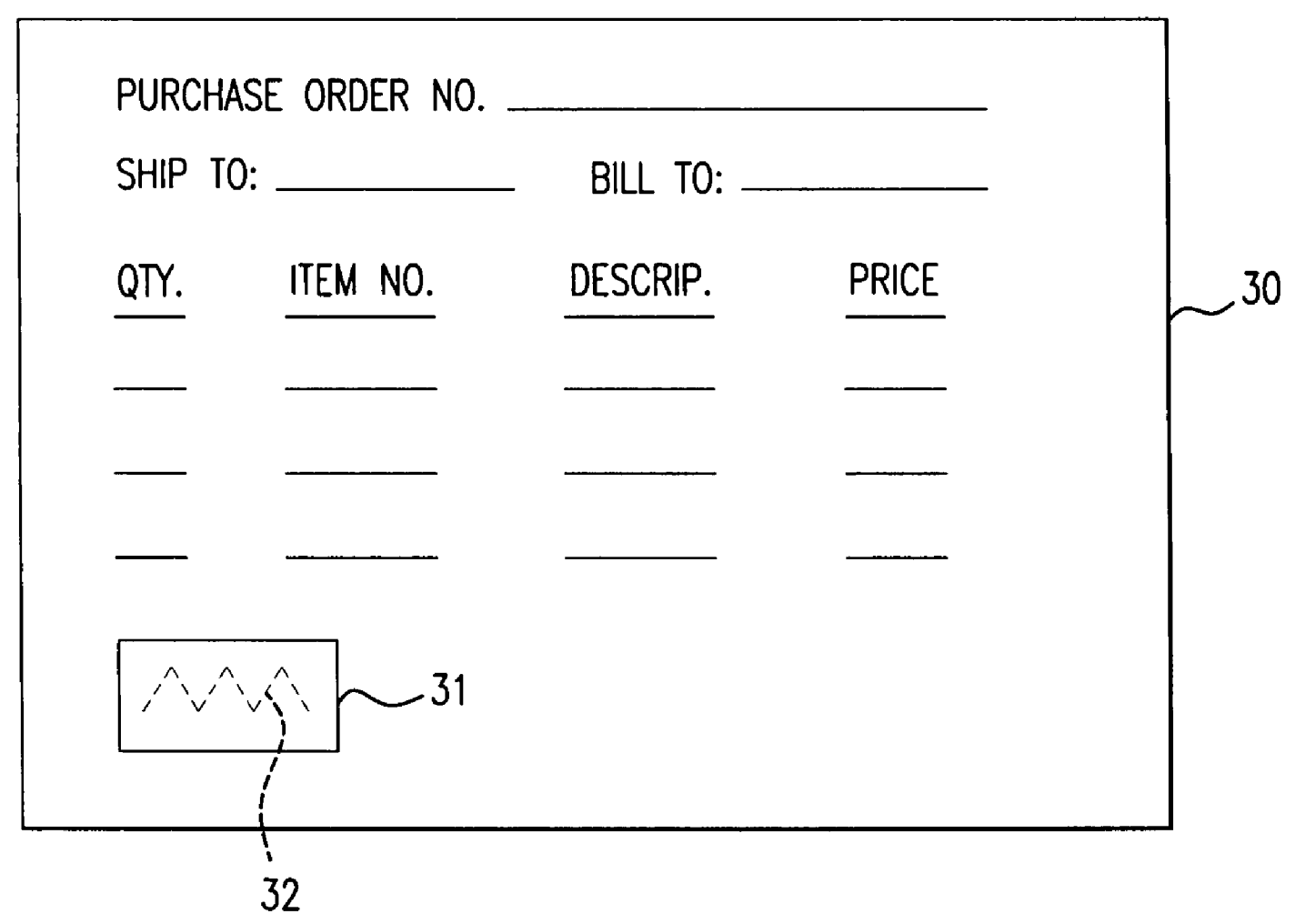
Figure 5A:
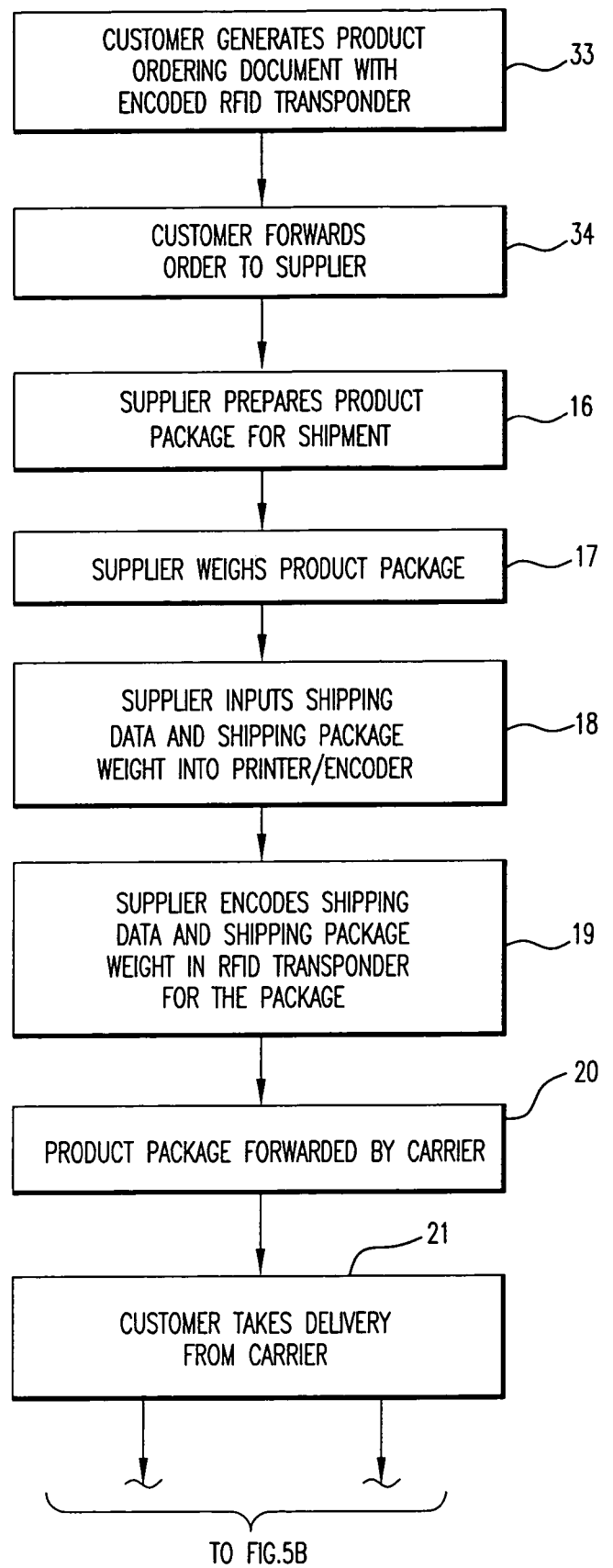
FIG. 5 is a flow chart illustrating another embodiment of the invention.
Figure 5B:
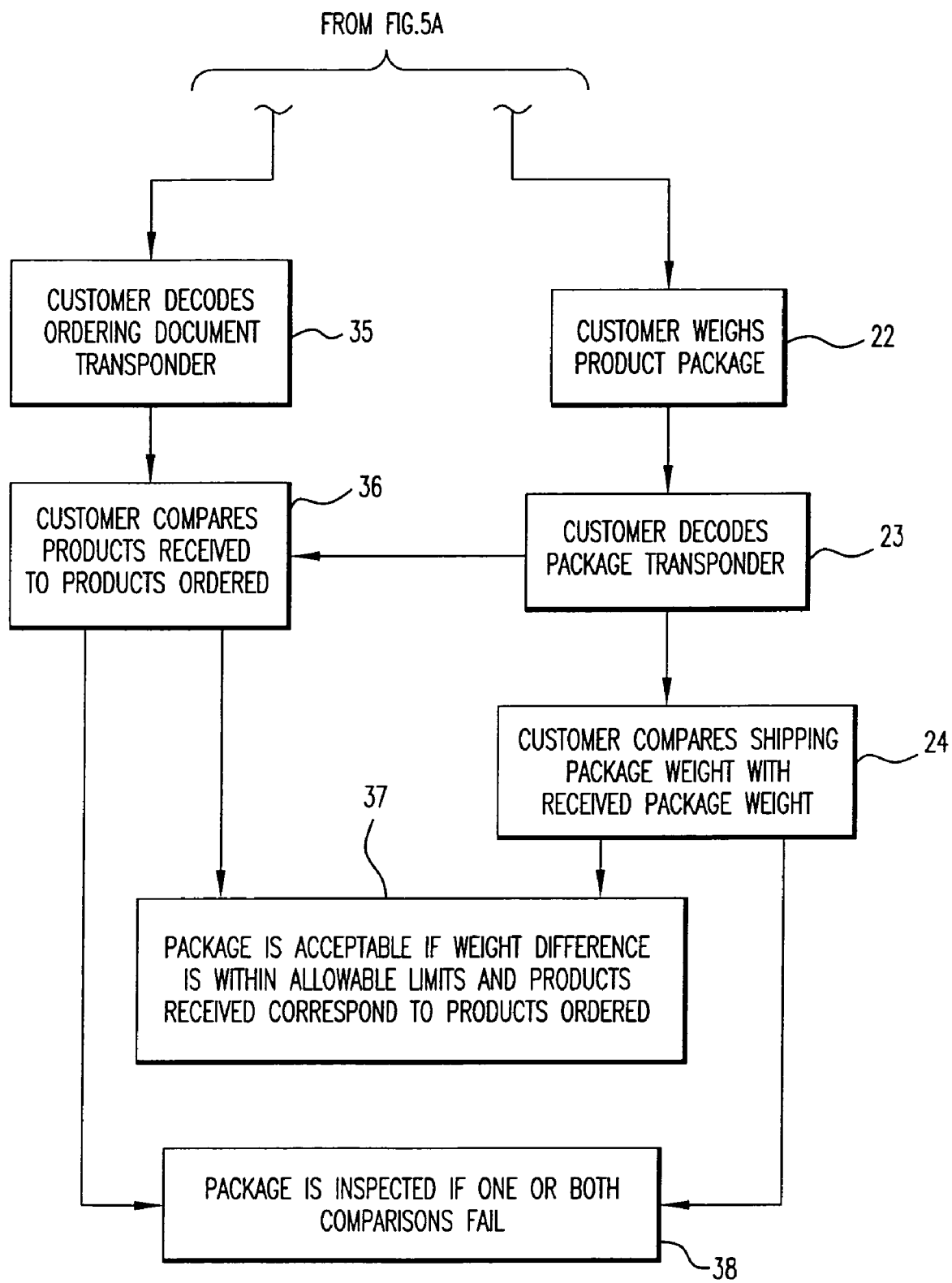

With reference to FIG. 4, there is illustrated diagrammatically an ordering document 30 in the form of a purchase order, however, an ordering document can take many forms. The customer visually records the quantity of products being ordered, the codes designating the products ordered, a brief human readable description of the products ordered, and the price. According to the illustrated embodiment, the customer may either encode an RFID transponder which is already part of the ordering document 30 or, as shown applies an RFID label 31 having an RFID transponder 32 is encoded and applied directly to a copy of the ordering document 30. The customer retains the RFID transponder-encoded ordering document, as indicated in block 33 of FIG. 5. The original of the ordering document is either sent to the supplier by mail, facsimile, hand delivery or electronically as indicated in block 34. When the supplier receives the order, the supplier gathers the products represented by the order and prepares a product package for shipment as disclosed with respect to block 16. When the package is complete, the supplier weighs the package, block 17, and inputs shipping data and shipping package weight into a printer/encoder block 18. The shipping data includes the information in the purchase order as indicated above and any other desired information. If the RFID transponder is already part of the ordering document 30, then the RFID transponder can be encoded with a hand-held RFID reader/writer as in U.S. patent application Ser. No. 10/222,692 filed Aug. 16, 2002, the disclosure of which is incorporated herein by reference.

The process proceeds through steps 19 through 24 as disclosed above. Also, when the customer takes delivery, block 21; the customer decodes the ordering document transponder 32 as indicated at block 35. In that both the shipping data and the shipping package weight were decoded at block 23, both the decoded data from the ordering document and the shipping data are compared at block 36. If the products received correspond to the products ordered and the shipping weight encoded by the supplier and the actual weight of the package received by the customer correspond within acceptable limits, the package is found acceptable, block 37. However, if either of these comparisons fails, the package and/or its contents are further inspected (block 38) to ascertain the nature of the discrepancy, for example, off-line in a compound area. If desired, the customer can print out the shipping data and/or the shipping package weight to serve as a hard copy record, particularly in the event there is a discrepancy; alternatively, these data may simply be viewed on a display or other visual medium.

Other embodiments and modifications of the invention will suggest themselves to those skilled in the art, and all such of these as come within the spirit of this invention are included within its scope as best defined by the appended claims.

We claim:

1. Method of verification, comprising:
   (a) providing a product ordering document listing one or more products and having an RFID transponder encoded with data representative of the listed product(s),
   (b) ordering the product(s) from the supplier, (c) providing a data-encoded RFID transponder on the product(s) or on the packaging for the product(s) to be shipped to the customer,
(d) shipping the product(s) to the customer,
(e) decoding the RFID transponder on the ordering document,
(f) decoding the RFID transponder on the received product(s) or packaging, and
(g) comparing the decoded data from the ordering document and the decoded data from the product(s) or packaging to verify whether or not such data correspond.

2. Method as defined in claim 1, wherein (a) includes:
(h) preparing an RFID label, and
(i) applying the RFID label to the ordering document.

3. Method as defined in claim 1, wherein (c) includes the supplier:
(h) applying an RFID encoded label to the product(s) or the packaging.

4. Method of verification, comprising:
(a) providing a product ordering document listing one or more products and having an RFID transponder encoded with data representative of the listed product(s),
(b) ordering the products from the supplier,
(c) providing an RFID transponder for the product(s) or its packaging encoded with the product data and the shipping package weight,
(d) shipping the packaged product(s) to a customer,
(e) weighing the packaged product after delivery to the customer,
(f) decoding the transponder's product data and the shipping package weight,
(g) decoding the transponder on the ordering document,
(h) comparing the decoded data from the ordering document and the decoded data for the product(s) or the packaging to verify whether or not such ordering data correspond, and
(i) comparing the shipping package weight with the received package weight to indicate tampering when the difference between the shipping package weight and the received package weight is outside allowable limits.

5. Method as defined in claim 4, wherein when either (h) or (i) do not compare favorably the shipment is deemed to have been flawed.

* * * * *